US011067102B1

(12) United States Patent
Williams et al.

(10) Patent No.: US 11,067,102 B1
(45) Date of Patent: Jul. 20, 2021

(54) DIGITAL PROPORTIONAL PRESSURE CONTROLLER

(71) Applicant: MAC Valves, Inc., Wixom, MI (US)

(72) Inventors: Kevin C. Williams, Wixom, MI (US); Thomas Jones, Wolverine Lake, MI (US); Thierry Delvaux, Plainevaux (BE); Gilles Raets, Tavier (BE)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 16/847,029

(22) Filed: Apr. 13, 2020

(51) Int. Cl.
*F15B 13/043* (2006.01)
*F15B 21/00* (2006.01)

(52) U.S. Cl.
CPC ........ *F15B 13/0431* (2013.01); *F15B 13/043* (2013.01); *F15B 21/005* (2013.01)

(58) Field of Classification Search
CPC .......................... F15B 11/0426; F15B 13/043; F15B 13/0431; F15B 2211/40592
See application file for complete search history.

(56) References Cited

U.S. PATENT DOCUMENTS

| | | | | |
|---|---|---|---|---|
| 4,170,245 A * | 10/1979 | Haley | ................ | F15B 11/0426 137/487.5 |
| 4,763,560 A * | 8/1988 | Sasaki | .................. | F15B 11/006 91/361 |
| 8,215,227 B2 * | 7/2012 | Siivonen | ............... | F15B 20/008 91/444 |
| 8,333,218 B2 * | 12/2012 | Walsh | ................. | F15B 13/0431 137/596.16 |
| 8,920,575 B2 * | 12/2014 | Hopponen | ............ | F15B 21/041 134/22.12 |
| 9,080,581 B2 * | 7/2015 | Bocsanyi | .............. | F15B 13/081 |

* cited by examiner

*Primary Examiner* — Michael Leslie
(74) *Attorney, Agent, or Firm* — Harness, Dickey & Pierce, P.L.C.

(57) ABSTRACT

A valve assembly having a plurality of fill valves that permit a fluid to flow from a fluid inlet into an interior flow path to increase a pressure of the fluid output from a fluid outlet, and a plurality of dump valves that permit the fluid to flow from the interior flow path to an exhaust to reduce the pressure of the fluid output from the fluid outlet. The valve assembly includes a controller that is configured for receipt of a command signal including a desired pressure of the fluid to be output from the fluid outlet, and is configured for receipt of a signal from a pressure sensor that is indicative of an actual pressure of the fluid output from the fluid outlet, wherein based on a comparison of the command signal with the signal indicative of the actual pressure, the controller is configured to selectively open and close each of the fill valves and each of the dump valves until the actual pressure is equal to the desired pressure.

20 Claims, 16 Drawing Sheets

US 11,067,102 B1

DIGITAL PROPORTIONAL PRESSURE CONTROLLER

FIELD

The present disclosure relates to a digital proportional pressure controller for, for example, a fluid valve.

BACKGROUND

This section provides background information related to the present disclosure which is not necessarily prior art.

Proportional pressure controllers often include main internal valves which are moved to permit a pressurized fluid to be discharged to a pressure controlled device. Such proportional pressure controllers regulate the operating pressure of the pressurized fluid at the pressure controlled device. The main valves are commonly repositioned using solenoids operators. This configuration increases weight and expense of the proportional pressure controller and requires significant electrical current to reposition the main valves.

Known proportional pressure controllers are also often susceptible to system pressure undershoot or overshoot. Due to the mass and operating time of the main valves, signals controlling the main valves to reduce or stop pressurized fluid flow to the pressure controlled device may occur too soon or too late to avoid either not reaching or exceeding the desired operating pressure. When this occurs, the control system operating the solenoid actuators begins a rapid opening and closing sequence as the controller "hunts" for the desired operating pressure. This rapid operation known as "motor-boating", increases wear and the operating costs associated with the proportional pressure controller.

Known proportional pressure controllers often include an inlet port, an outlet port, and an exhaust port. A high pressure fluid is typically supplied to the inlet port, after passing through the proportional pressure controller, the fluid exits to the pressure controlled device through the outlet port, and excess fluid pressure is vented from the proportional pressure controller through the exhaust port. Another problem associated with known proportional pressure controllers is that it is difficult to achieve zero pressure at the outlet port of the proportional pressure controller even when a zero pressure condition at the outlet port is desired. The inability to create zero pressure at the outlet port of the proportional pressure controller can negatively affect the operation and/or performance of the pressure controlled device.

In addition, fluid may sometimes backflow from the pressure operated device back into the outlet and reenter proportional pressure controller. This is undesirable from the standpoint that the return flow of fluid may be contaminated or dirty, which can negatively affect a pressure sensor of the proportional pressure controller.

SUMMARY

This section provides a general summary of the disclosure, and is not a comprehensive disclosure of its full scope or all of its features.

The present disclosure provides a valve assembly having a plurality of fill valves that permit a fluid to flow from a fluid inlet into an interior flow path to increase a pressure of the fluid output from a fluid outlet, and a plurality of dump valves that permit the fluid to flow from the interior flow path to an exhaust to reduce the pressure of the fluid output from the fluid outlet. The valve assembly includes a controller that is configured for receipt of a command signal including a desired pressure of the fluid to be output from the fluid outlet, and is configured for receipt of a signal from a pressure sensor that is indicative of an actual pressure of the fluid output from the fluid outlet, wherein based on a comparison of the command signal with the signal indicative of the actual pressure, the controller is configured to selectively open and close each of the fill valves and each of the dump valves until the actual pressure is equal to the desired pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
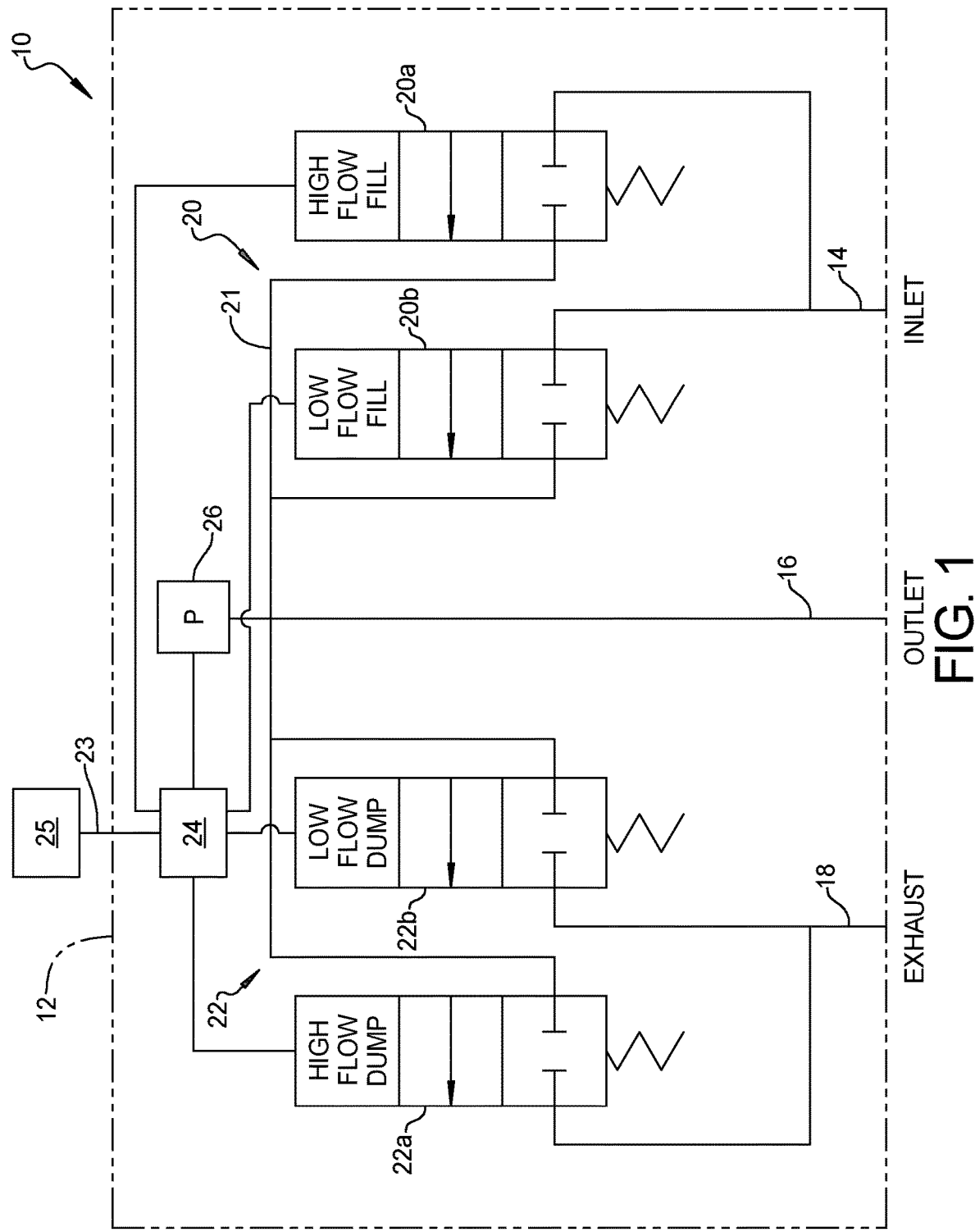
FIG. 1 is a schematic representation of an example valve assembly according to a principle of the present disclosure.

FIG. 1 schematically illustrates a valve assembly 10 according to a principal of the present disclosure. Valve assembly 10 includes a housing 12 having a fluid inlet 14, a fluid outlet 16, and an exhaust 18. Valve assembly 10 includes a plurality of fill valves 20 in communication with fluid inlet 14 and fluid outlet 16. Valve assembly 10 also includes a plurality of dump valves 22 in communication with exhaust 18. An interior flow path or secondary pressure path 21, which is a series of open pathways within housing 12, interconnects fill valves 20, dump valves 22, and outlet 16. A controller 24 communicates with a pressure sensor 26 and each of fill valves 20 and dump valves 22 to dynamically control fluid flow through valve assembly 10, and to dynamically control a pressure of the fluid at outlet 16 of valve assembly 10. Pressure sensor 26 communicates with secondary flow path 21, which communicates with outlet 16, to generate a signal indicative of a pressure within secondary flow path 21 and outlet 16. In the example embodiment illustrated, valve assembly 10 is configured to pressurize and restrict the flow of air. It should be understood, however, that valve assembly 10 can be configured to pressurize and restrict any fluid known to one skilled in the art including gases and liquids.

Figure 2:
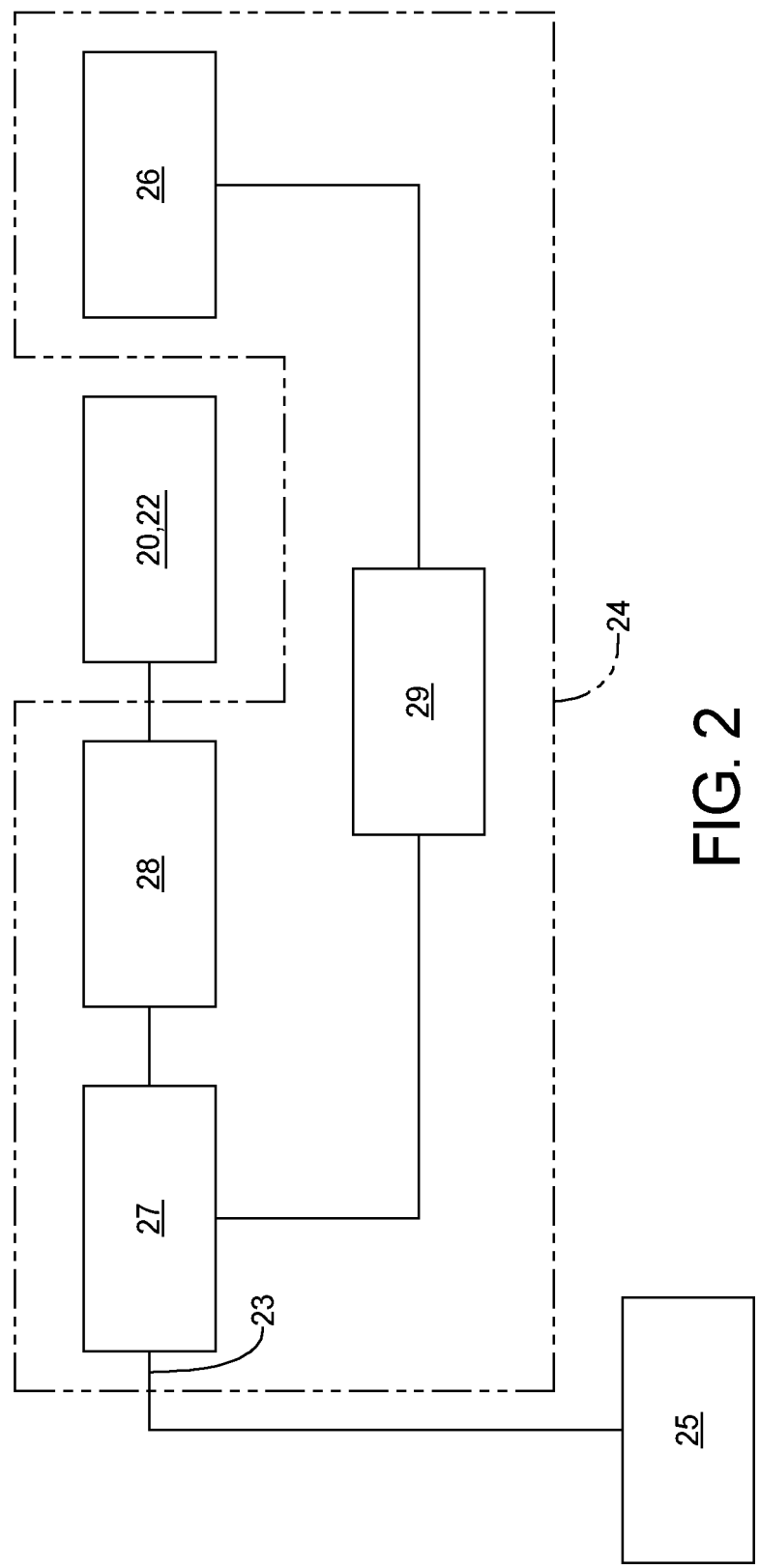
FIG. 2 is a schematic representation of a controller of the example valve assembly.

As best shown in FIG. 2, controller 24 includes an input 23 configured for receipt of a voltage, current, or digital input (hereinafter "command signal") from another controller or circuit 25 of a system (not illustrated) within which valve assembly 10 is used. For example, the system within which valve assembly 10 is used can be an actuator system. In general, the command signal is a signal indicative of the desired pressure to be output from valve assembly 10 through outlet 16. Input 23 may also be configured to receive power from a power source (not illustrated) that is used to power controller 24 and valve assembly 10.

After receipt of command signal, input 23 communicates the command signal to a signal differentiation circuit 27. Signal differentiation circuit 27 is configured to compare the command signal with a signal received from a pressure sensor 26 that is indicative of a pressure at outlet 16. Based on the comparison between the command signal received by controller and the periodic pressure signals output by pressure sensor 26, controller 24 is configured to dynamically control each of the fill valves 20 and dump valves 22 to control the pressure at which fluid is output from outlet 16 as will be described in more detail later. Controller 24 may also include a sensor correction circuit 29 that receives the pressure signal from pressure sensor 26 and corrects the pressure signal to a known sensor output versus a known pressure standard, and then communicates the corrected signal to signal differentiation circuit 27 where the corrected signal is compared to the command signal. It should also be understood that controller 24 may be configured to output a feedback signal to an operator of the system that can be a voltage, current, or digital signal that is indicative of the pressure being output by the valve assembly 10, or indicative that the pressure of the command signal is being output by valve assembly 10.

Although pressure sensor 26 is illustrated as being part of controller 24 in FIG. 2, it should be understood that pressure sensor 26 may be separate from controller 24 as illustrated in FIG. 1. Moreover, pressure sensor 26 can be any type of pressure sensor that can generate a signal indicative of pressure. Specifically, the signal generated by pressure sensor 26 can be a voltage, a current, or a digital signal without departing from the scope of the present disclosure.

Fill valves 20 and dump valves 22 may each be direct-operated solenoid valves, solenoid pilot-operated valves, or any other type of electrically operated valve known to one skilled in the art. To open and close valves, controller 24 may have integrated therewith a valve driver circuit 28 that is configured to apply a voltage independently to each fill valves 20 and dump valves 22 based on an input received from signal differentiation circuit 27. Alternatively, valve driver circuit 28 may be separate from controller 24 and in communication with controller 24. Regardless, based on the pressure detected by pressure sensor 26, controller 24 is configured to instruct valve driver circuit 28 to apply a voltage to fill valves 20 and/or dump valves 22 to open fill valves 20 and/or dump valves 22. To close fill valves 20 and/or dump valves 22, controller 24 instructs valve driver circuit 28 to stop applying the voltage to fill valves 20 and/or dump valves 22.

In the illustrated embodiment, fill valves 20 include a high-flow fill valve 20a and a low-flow fill valve 20b. High-flow fill valve 20a is generally configured to allow for a greater amount of fluid to flow therethrough in comparison to low-flow fill valve 20b. The greater amount of fluid flow through high-flow fill valve 20a may be enabled by high-flow fill valve 20a having a greater orifice size in comparison to that of low-flow fill valve 20b, or by high-flow fill valve 20a being larger than low-flow fill valve 20b. Similarly, dump valves 22 include a high-flow dump valve 22a and a low-flow dump valve 22b. High-flow dump valve 22a is generally configured to allow for a greater amount of fluid to flow therethrough in comparison to low-flow dump valve 22b. The greater amount of fluid flow through high-flow dump valve 22a may be enabled by high-flow dump valve 22a having a greater orifice size in comparison to that of low-flow dump valve 22b, or by high-flow dump valve 22a being larger than low-flow dump valve 22b.

Figure 3:
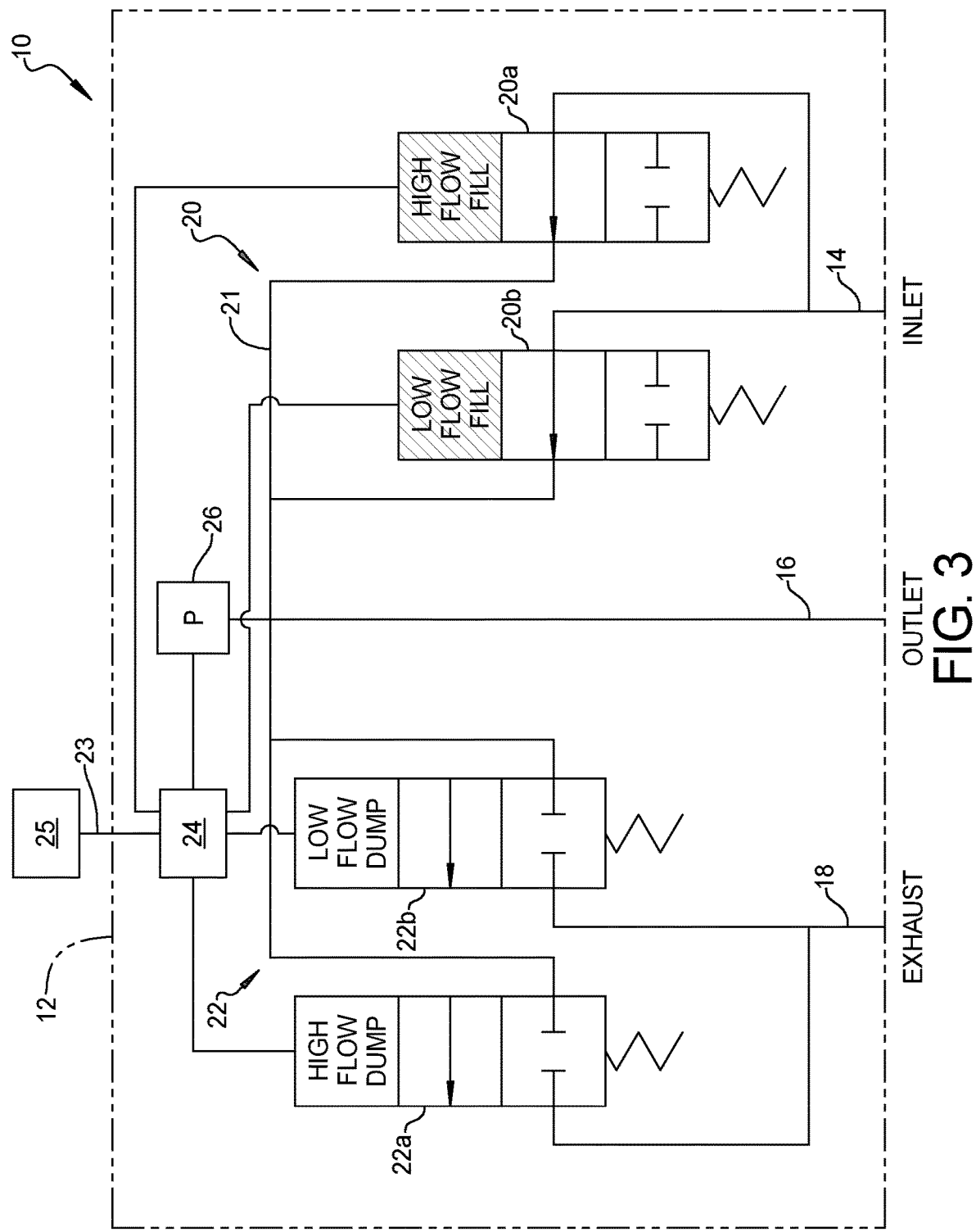
FIG. 3 is a schematic representation of the valve assembly when the valve assembly is being used to quickly pressurize a fluid.

FIG. 1 illustrates a configuration of valve assembly 10 when each of the fill valves 20 and each of the dump valves 22 are closed (i.e., the pressure at outlet 16 is zero, or the pressure at outlet 16 is at the pressure indicated by the command signal). Now referring to FIGS. 3 to 6, a method of pressurizing and outputting the fluid from valve assembly 10 at an increased pressure will be described. FIG. 3 illustrates a configuration where valve assembly 10 is energized to quickly pressurize valve assembly 10 and the fluid output from outlet 16.

Figure 4:
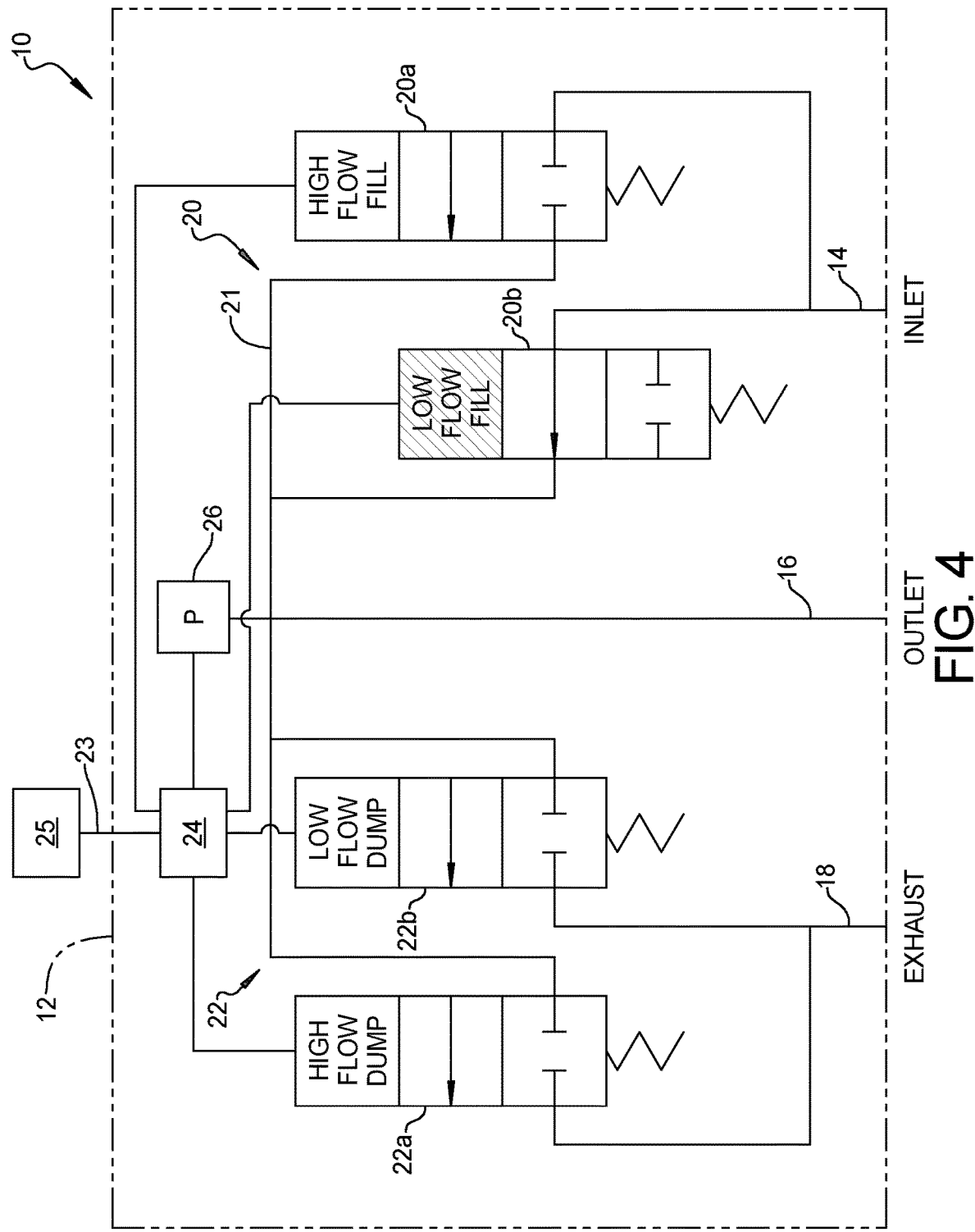
FIG. 4 is a schematic representation of the valve assembly when the valve assembly is being used to slowly pressurize a fluid.

Specifically, when valve assembly 10 is to be quickly pressurized from a pressure of, for example, zero to, for example, a pressure of thirty psi, controller 24 instructs valve driver circuit 28 to apply a voltage to both fill valves 20. When each fill valve 20 is energized, fluid is permitted to flow from fluid inlet 14 and through each fill valve 20 into secondary pressure path 21 and be output from outlet 16. Pressure sensor 26 monitors a pressure as fluid is permitted to flow from fluid inlet 14, through each fill valve 20 to secondary pressure path 21 and to outlet 16. As the pressure approaches the desired pressure (e.g., thirty psi), controller 24 instructs valve driver circuit 28 to stop energizing high-flow fill valve 20a (FIG. 4). Because low-flow fill valve 20b is still energized, fluid is still permitted to flow from fluid inlet 14 through low-flow fill valve 20b to outlet 16, which enables valve assembly 10 to slowly reach the desired pressure (e.g., thirty psi) to be output from outlet 16. In this manner, the chance of overshooting (i.e., allowing the pressure to be greater than the desired pressure) the desired pressure is prevented or at least substantially minimized. Once controller 24 receives a signal from pressure sensor 26 that the pressure at outlet 16 has reached the desired pressure, controller 24 instructs valve driver circuit 28 to stop energizing low-flow fill valve 20b.

If, after de-energizing the fill valves 20, the pressure at outlet 16 detected by pressure sensor 26 has overshot (i.e., is greater than) the desired pressure (e.g., thirty psi), controller 24 is configured to instruct valve driver circuit 28 to energize low-flow dump valve 22b (FIG. 5), which permits fluid to slowly exit valve assembly 10 through exhaust 18. Because only low-flow dump valve 22b is energized, the pressure at outlet 16 is allowed to slowly reduce to the desired pressure. Once controller 24 receives a signal from pressure sensor 26 that the pressure at outlet 16 has reached the desired pressure, controller 24 instructs valve driver circuit 28 to stop energizing low-flow dump valve 22b. Alternatively, if pressure sensor 26 detects that pressure at outlet 16 has decreased below the desired pressure due to use of low-flow dump valve 22b, controller 24 may instruct valve driver circuit 28 to re-energize low-flow fill valve 20a to allow the pressure at outlet 16 to again gradually increase to the desired pressure (FIG. 4).

Figure 6:
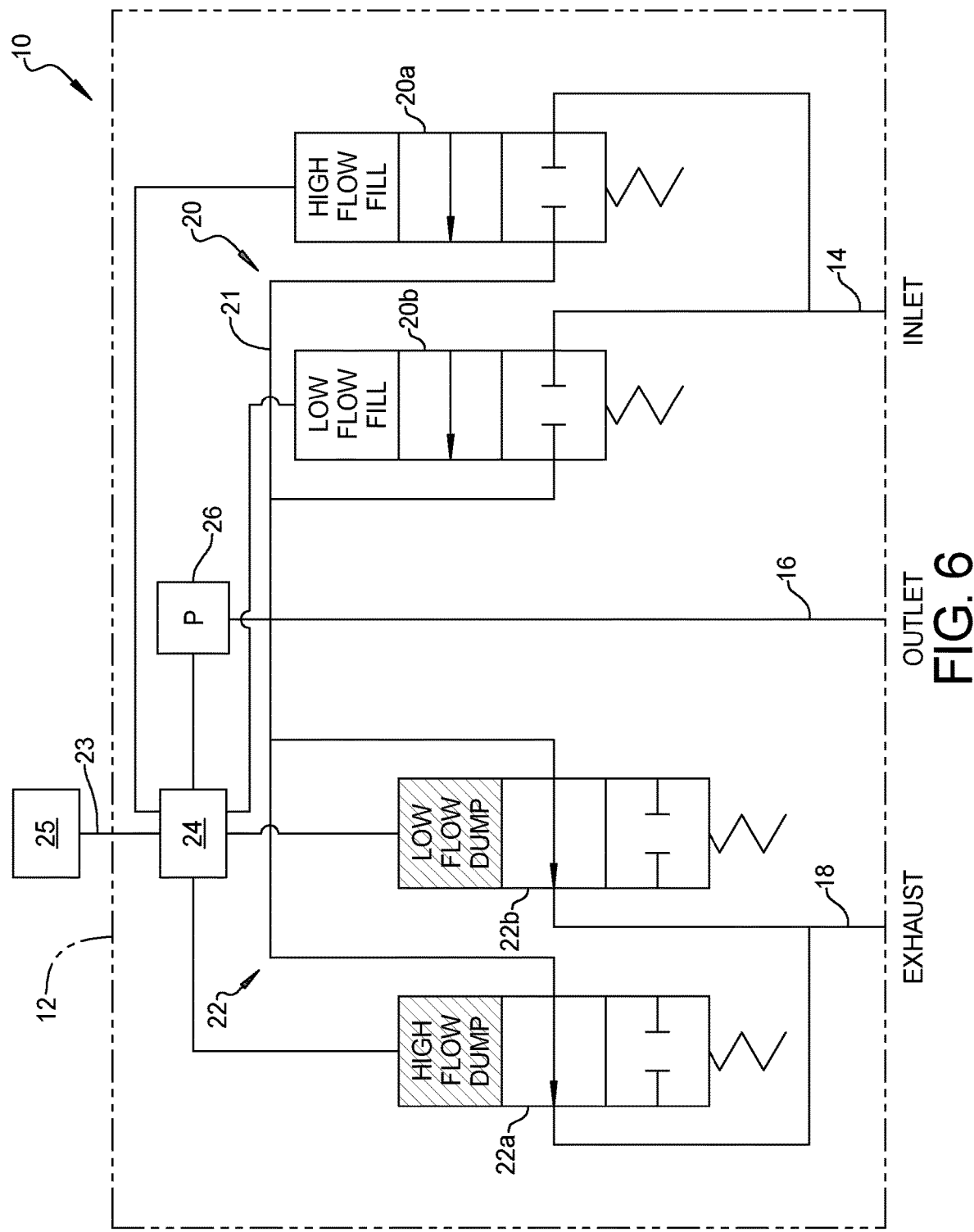
FIG. 6 is a schematic representation of the valve assembly when the valve assembly is being used to quickly depressurize a fluid.

FIG. 6 illustrates a situation where it may be necessary to quickly reduce the pressure at outlet 16 to, for example, a pressure of zero. In such a situation, controller 24 may instruct valve driver circuit 28 to energize each dump valve 22 to quickly allow fluid to exit valve assembly 10 through each dump valve 22 and exhaust 18. While each dump valve 22 is illustrated in FIG. 6 as being energized to quickly lower the pressure at outlet 16, it should be understood that only high-flow dump valve 22a may be used to reduce the pressure at outlet 16.

Figure 5:
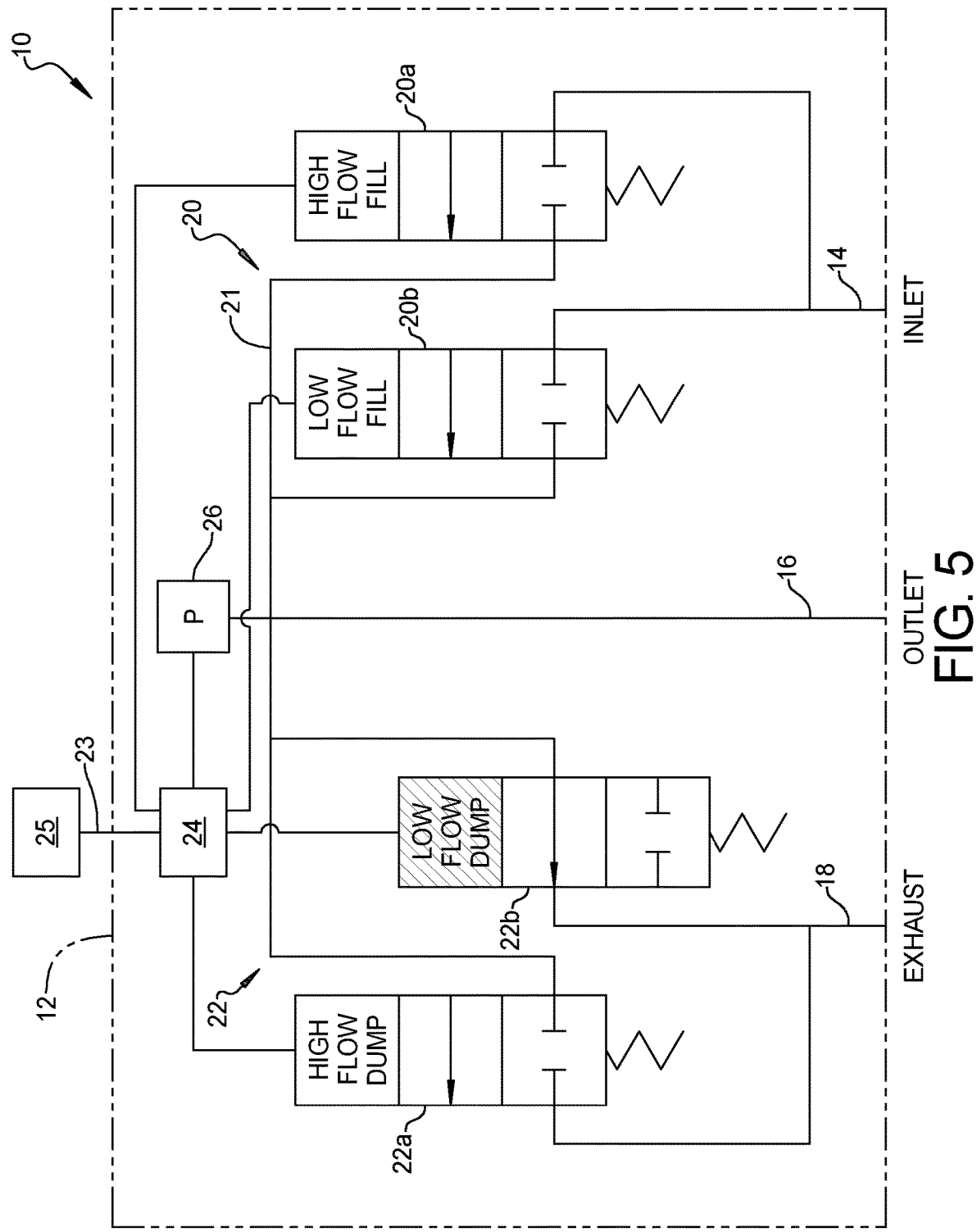
FIG. 5 is a schematic representation of the valve assembly when the valve assembly is being used to slowly depressurize a fluid.

While the configuration of FIG. 6 can be used to quickly lower the pressure at outlet 16 to zero, it should also be understood that the configuration of FIG. 6 can be used when the pressure at outlet 16 is relatively high (e.g., thirty psi), and the system that incorporates valve assembly 10 only requires an output of fluid at a pressure that is substantially reduced (e.g., fifteen psi). In such an instance, both dump valves 22 or only high-flow dump valve 22a can be energized to quickly reduce the pressure at outlet 16. As pressure sensor 26 monitors the reduction in pressure, high-flow dump valve 22a can be de-energized to slow the reduction in pressure toward the target pressure (e.g., fifteen psi), which allows only low-flow dump valve 22b to permit the fluid to be exit valve assembly 10 through exhaust 18 (FIG. 5). If the pressure at outlet 16 detected by pressure sensor 26 undershoots (i.e., is less than) the target pressure (e.g., fifteen psi), low-flow dump valve 22b may be de-energized and low-flow fill valve 20b may be re-energized (FIG. 4) to allow the pressure at outlet 16 to reach the target pressure.

According to the above-described embodiment, the pressure and fluid output from valve assembly 10 can be dynamically controlled. In other words, by continuously using pressure sensor 26 to detect the pressure at outlet 16, each fill valve 20 and dump valve 22 can be controlled to increase the pressure at outlet 16, decrease the pressure at outlet 16, or maintain the pressure at outlet 16. Moreover, due to the use of low-flow fill valve 20b and low-flow dump valve 22b, the pressure at outlet 16 can be more strictly controlled to substantially minimize instances where the desired or target pressures has either been overshot or undershot. In addition, if only small pressure changes are required at outlet 16, one or both of low-flow fill valve 20b and low-flow dump valve 22b can be used to achieve the small changes in pressure desired. Further, it should be understood that by using multiple fill valves 20 and dump valves 22, if one of the fill valves 20 and/or dump valves 22 fails, the valve assembly 10 is still operable, albeit with reduced capability.

While the embodiment illustrated in FIGS. 1 and 3 to 6 utilized fill valves 20 and dump valves 22 that included one high-flow valve 20a and 22a and one low-flow valve 20b and 22b in each set of valves, the present disclosure should not be limited thereto. In this regard, the fill valves 20 may include a greater number of high-flow fill valves 20a and/or low-flow fill valves 20b, and the dump valves 22 may include a greater number of high-flow dump valves 22a and/or low-flow dump valves 22b.

For example, referring to FIGS. 7 to 14, an embodiment is illustrated where valve assembly 10 includes a plurality of fill valves 20 that includes a high-flow fill valve 20a, a low-flow fill valve 20b, a lower-flow fill valve 20c, and a lowest-flow fill valve 20d. Valve assembly 10 also includes a plurality of dump valves 22 that includes a high-flow dump valve 22a, a low-flow dump valve 22c, and a lower-flow dump valve 22c. Any combination of fill valves 20 and any combination of dump valves 22 is contemplated. For example, any of the fill valves 20a-20d could be omitted in favor of another high-flow fill valve 20a, another low-flow fill valve 20b, another lower-flow fill valve 20c, or another lowest-flow fill valve 20d. Similarly, any of the dump valves 22a-22c could be omitted in favor of another high-flow dump valve 22a, another low-flow dump valve 22b, or another lower-flow fill valve 20c. In addition, it should be understood that dump valves 22 may also additionally include a lowest-flow dump valve that is similar to lowest-flow fill valve 20d.

Similar to the embodiment illustrated in FIGS. 1 and 3 to 6, the valve assembly 10 illustrated in FIGS. 7 to 14 includes a housing 12 having a fluid inlet 14, a fluid outlet 16, an exhaust 18, and secondary pressure path 21. Moreover, valve assembly 10 includes a controller 24 like that illustrated in FIG. 2 and pressure sensor 26. Although pressure sensor 26 is illustrated as being separate from controller 24 in FIGS. 7-14, it should be understood that pressure sensor 26 may be part of controller 24 as shown in FIG. 2. Regardless, based on the pressure detected by pressure sensor 26, controller 24 is configured to instruct valve driver circuit 28 to apply a voltage independently to each of the fill valves 20 and dump valves 22 to open and close the desired valves 20 and/or 22 to thereby precisely control the pressure at which fluid can be output from outlet 16.

In addition, although not required, housing 12 may include a secondary exhaust 30 that communicates only with lower-flow dump valve 22c. The use of secondary exhaust 30 may be advantageous when valve assembly 10 is used in an application to pressurize an actuator or actuators, and dirty or contaminated fluid (e.g., air) from the actuators may reenter valve assembly 10 through outlet 16 when the pressure is fully dumped to zero psi. In these instances, it is important to isolate pressure sensor 26 from this dirty or contaminated fluid.

Figure 7:
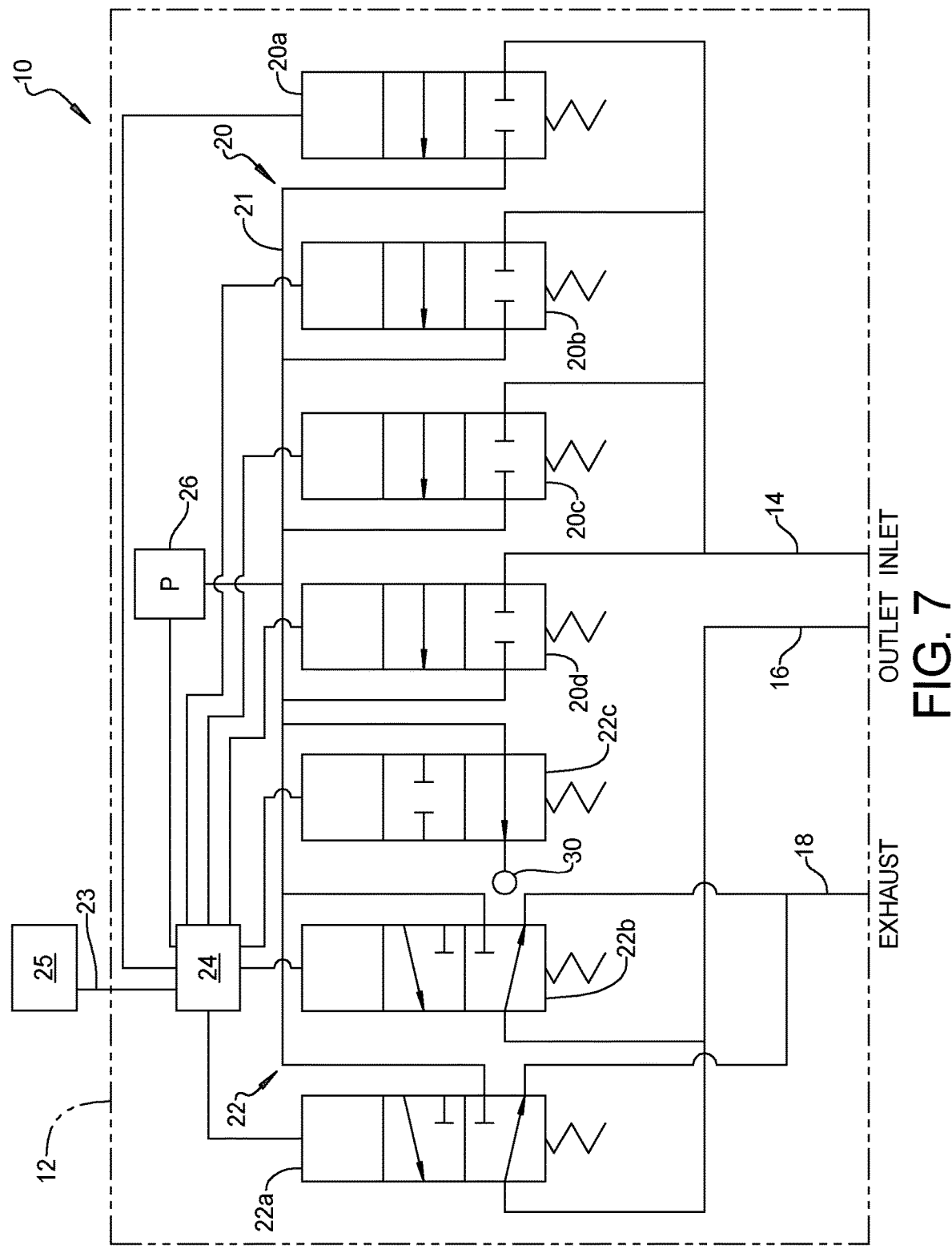
FIG. 7 is a schematic representation of another example valve assembly according to a principle of the present disclosure.

As shown in FIG. 7, when dump valves 22a and 22b are not energized, any fluid that reenters valve assembly 10 through outlet 16 will be routed by dump valves 22a and 22b directly to exhaust 18. In this manner, pressure sensor 26 is isolated from the dirty or contaminated fluid that may reenter valve assembly 10 through outlet 16. Moreover, when lower-flow dump valve 22 is not energized, it can be seen that lower-flow dump valve 22c communicates directly with secondary exhaust 30 which allows fluid within secondary pressure path 21 to exit valve assembly 10 through lower-flow dump valve 22 and out from secondary exhaust 30 to fully reduce pressure to zero psi. Once pressure sensor 26 determines that pressure within secondary pressure path 21 has been reduced to zero and the risk of dirty or contaminated air reentering the valve assembly 10 has ended, dump valves 22a and 22b may be reenergized to reconnect secondary pressure path 21 to outlet 16 through each of the dump valves 22a and 22b.

Figure 8:
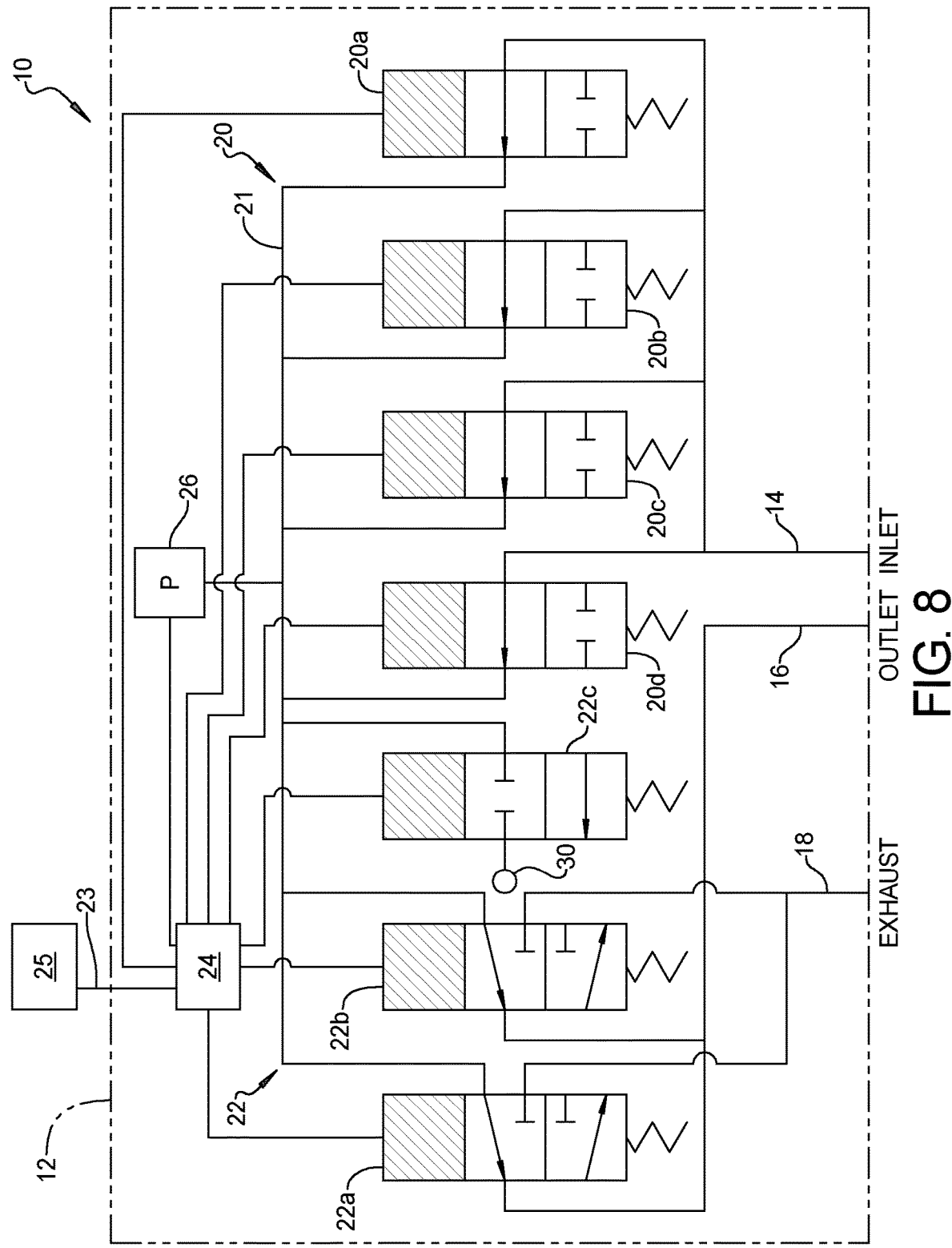
FIG. 8 is a schematic representation of the valve assembly when the valve assembly is being used to quickly pressurize a fluid.

As can be seen in FIG. 7, each of the fill valves 20 and each of the dump valves 22 are not energized such that the pressure at outlet 16 is zero psi, or at a pressure that corresponds to the command signal. In this regard, each of the fill valves 20 are closed and each of the dump valves 22 are in communication with either exhaust 18 or secondary exhaust 30. Now referring to FIGS. 8 to 14, a method of pressurizing and outputting the fluid from valve assembly 10 will be described. FIG. 8 illustrates a configuration where valve assembly 10 is energized to quickly increase the pressure at outlet 16.

Specifically, when the pressure at outlet 16 to be quickly increased from, for example, a pressure of zero to, for example, a pressure of thirty psi, controller 24 instructs valve driver circuit 28 to apply a voltage to each of the fill valves 20a-20d and to each of the dump valves 22a-22c. When each fill valve 20a-20d is energized, fluid is permitted to flow from fluid inlet 14 and through each fill valve 20a-20d into valve assembly 10. Further, upon energizing each of the dump valves 22a-22c, dump valves 22a and 22b will be actuated to communicate with outlet 16 rather than exhaust 18, and dump valve 22c will be actuated to cease communication with secondary exhaust 30.

Figure 9:
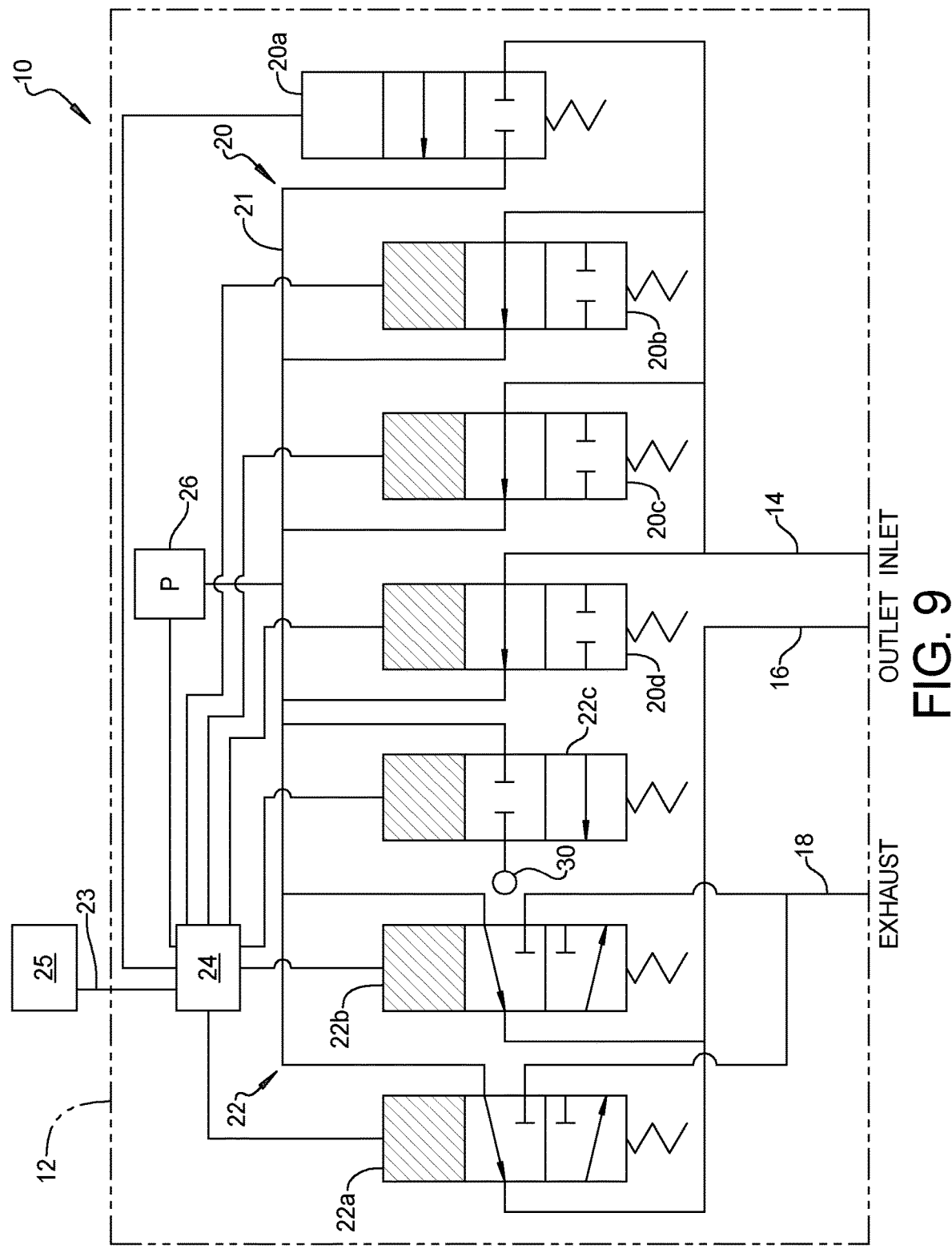
FIG. 9 is a schematic representation of the valve assembly when the valve assembly is being used to quickly pressurize a fluid, but at a slower rate in comparison to FIG. 8.
Figure 10:
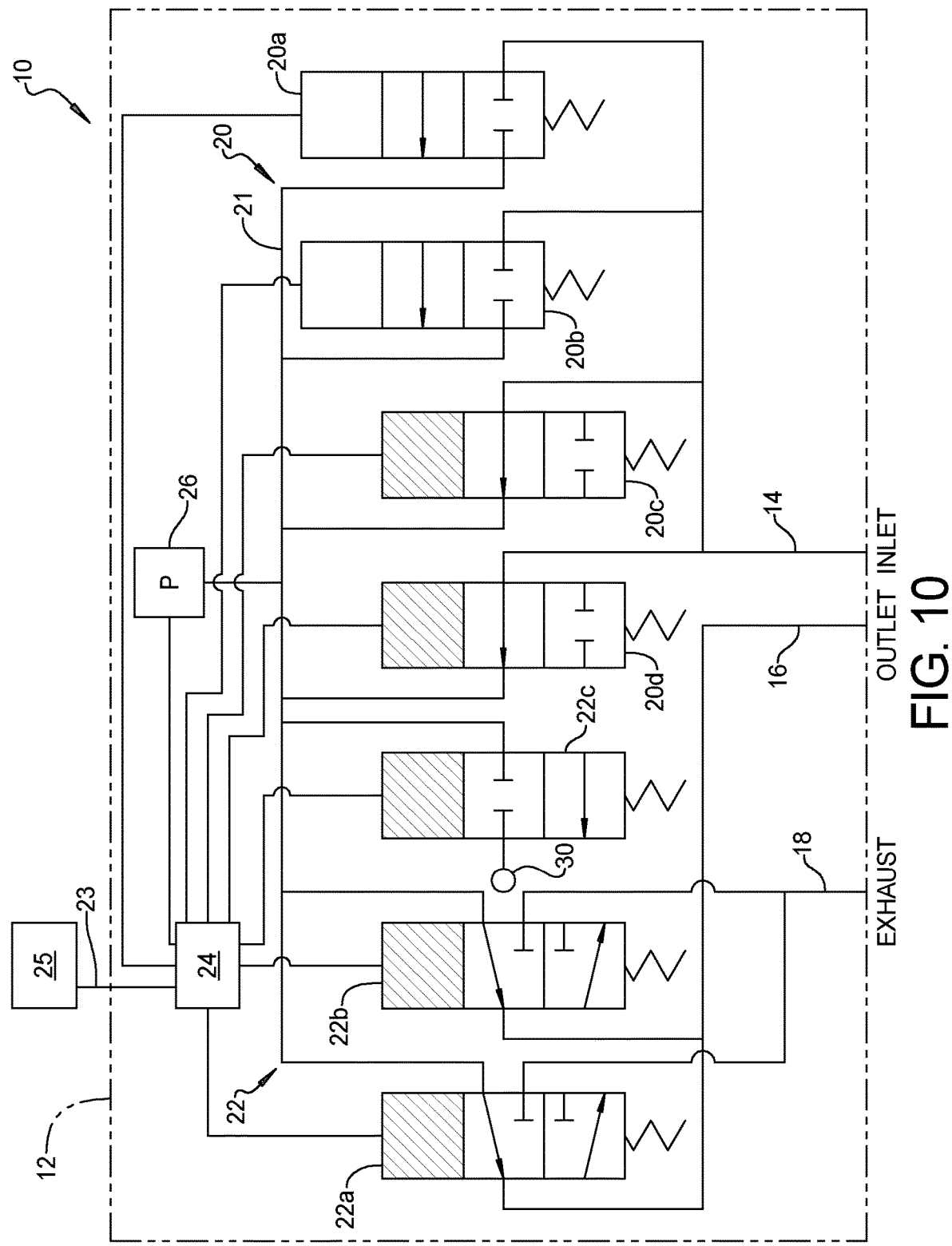
FIG. 10 is a schematic representation of the valve assembly when the valve assembly is being used to slowly pressurize a fluid.
Figure 11:
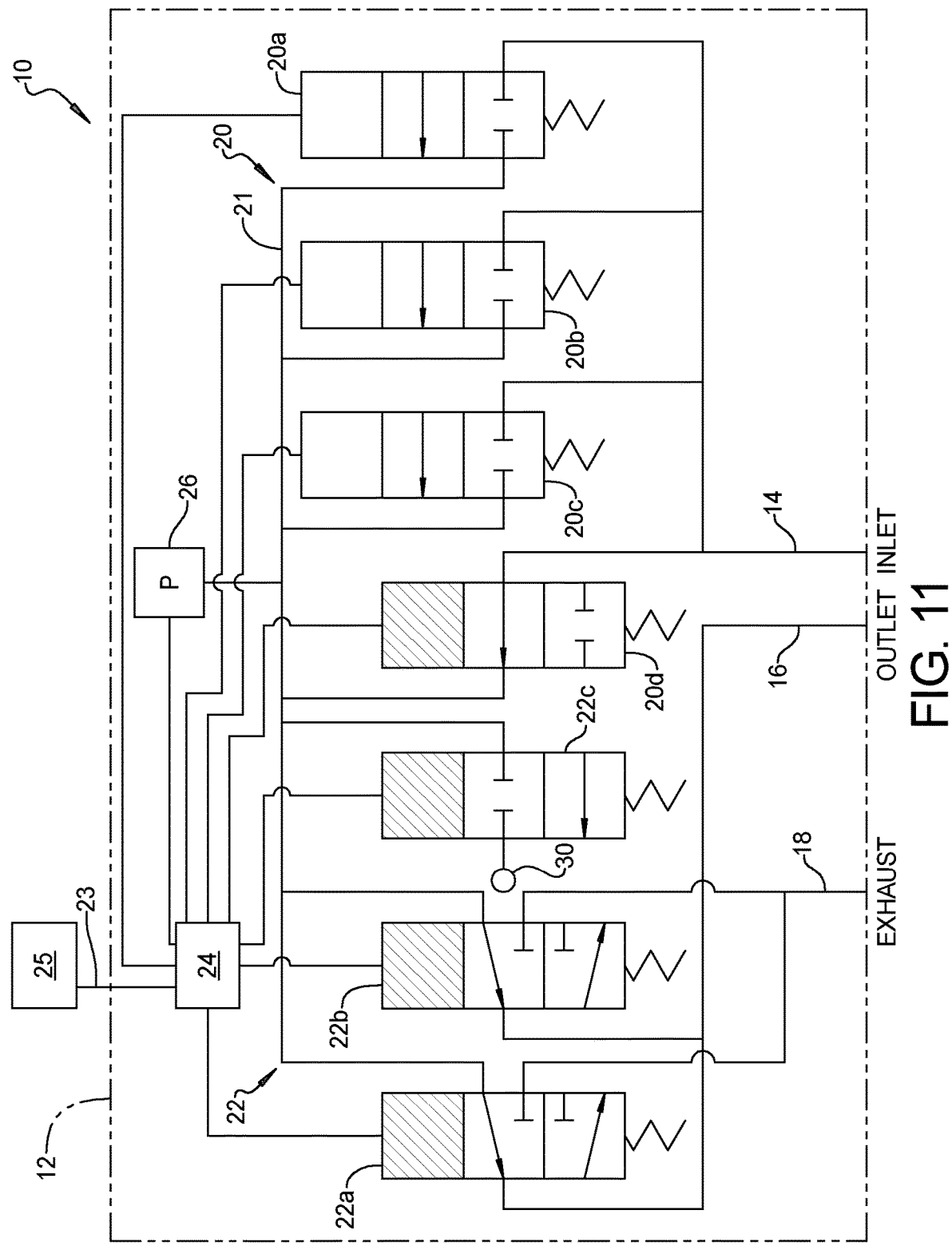
FIG. 11 is a schematic representation of the valve assembly when the valve assembly is being used to slowly pressurize a fluid, but at a slower rate in comparison to FIG. 10.
Figure 12:
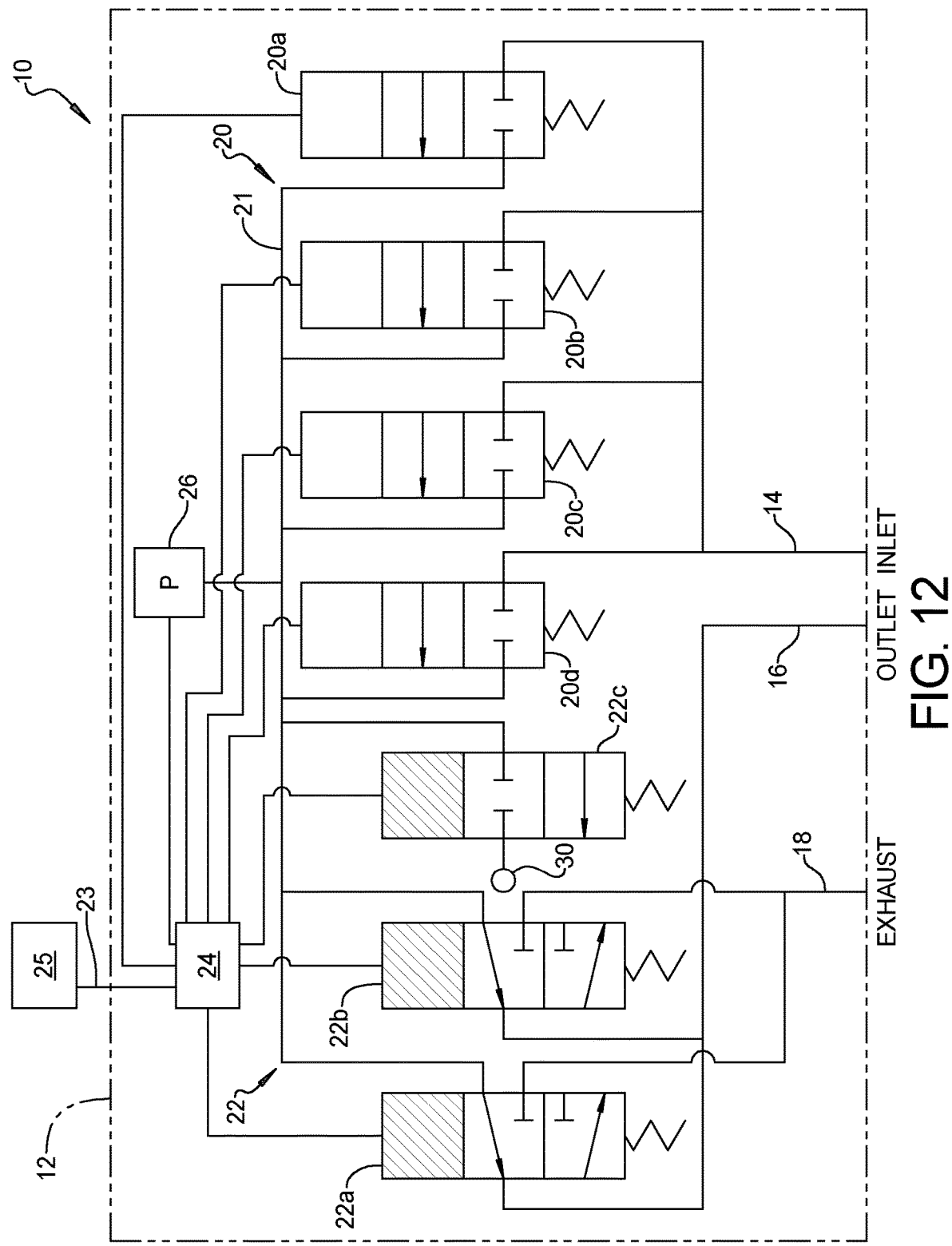
FIG. 12 is a schematic representation of the valve assembly when the fluid pressure is at the desired pressure.

Pressure sensor 26 monitors a pressure at outlet 16. As the pressure approaches the desired pressure (e.g., thirty psi), controller 24 instructs valve driver circuit 28 to stop energizing high-flow fill valve 20a (FIG. 9). Because the remaining fill valves 20b-20d are still energized, fluid is still permitted to flow from fluid inlet 14 through fill valves 20b-20d to outlet 16, which enables valve assembly 10 to more slowly reach the desired pressure (e.g., thirty psi). As the pressure continues to approach the desired pressure, controller 24 instructs valve driver circuit 28 to stop energizing low-flow fill valve 20b (FIG. 10). Because the remaining fill valves 20c and 20d are still energized, however, fluid is still permitted to flow from fluid inlet 14 through fill valves 20c and 20d to outlet 16, which enables valve assembly 10 to even more slowly reach the desired pressure. As the pressure continues to approach the desired pressure, controller 24 instructs valve driver circuit 28 to stop energizing lower-flow fill valve 20c (FIG. 11). Because the remaining fill valve 20d is still energized, however, fluid is still permitted to flow from fluid inlet 14 through fill valve 20d to outlet 16, which enables valve assembly 10 to still more slowly reach the desired pressure. Then, once the pressure finally approaches the desired pressure, controller 24 instructs valve driver circuit 28 to stop energizing lowest-flow fill valve 20d (FIG. 12). In this manner, the chance of overshooting (i.e., allowing the pressure to be greater than the desired pressure) the desired pressure is prevented or at least substantially minimized.

If, on the other hand, the pressure at outlet 16 detected by pressure sensor 26 has overshot (i.e., is greater than) the desired pressure (e.g., thirty psi), controller 24 may instruct valve driver circuit 28 to de-energize lower-flow dump valve 22c (FIG. 13), which permits fluid to slowly exit valve assembly 10 through secondary exhaust 30. Because only lower-flow dump valve 22c is de-energized, the pressure at outlet 16 is allowed to slowly reduce to the desired pressure. Once controller 24 receives a signal from pressure sensor 26 that the pressure at outlet 16 has reached the desired pressure, controller 24 instructs valve driver circuit 28 to energize lower-flow dump valve 22c (FIG. 12). Alternatively, if pressure sensor 26 detects that pressure at outlet 16 has decreased below the desired pressure due to use of lower-flow dump valve 22c, controller 24 may instruct valve driver circuit 28 to re-energize lowest-flow fill valve 20d to allow the pressure at outlet 16 to again gradually increase to the desired pressure (FIG. 11).

Figure 14:
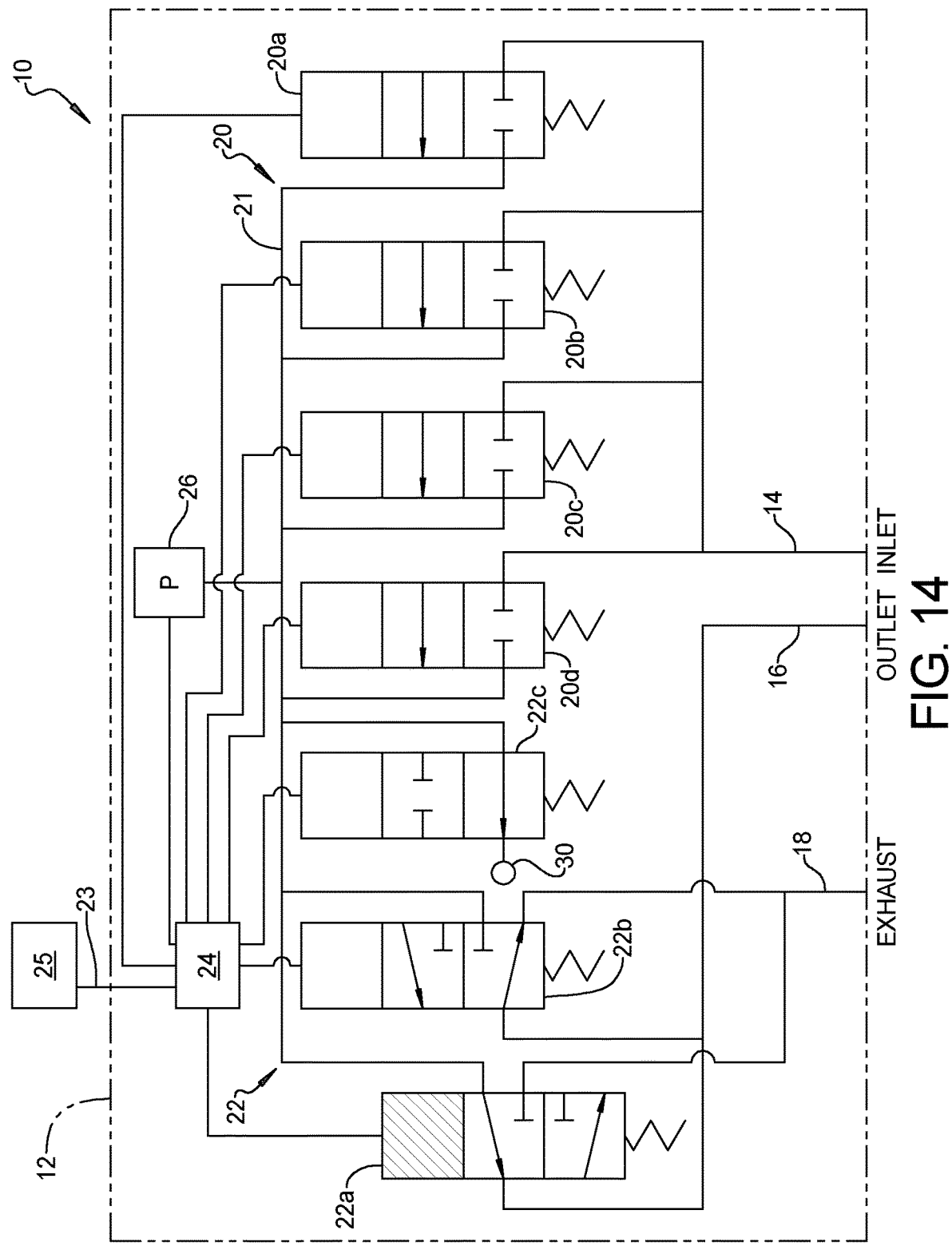
FIG. 14 is a schematic representation of the valve assembly when the valve assembly is being used to depressurize a fluid, but at a greater rate in comparison to FIG. 13.
Figure 15:
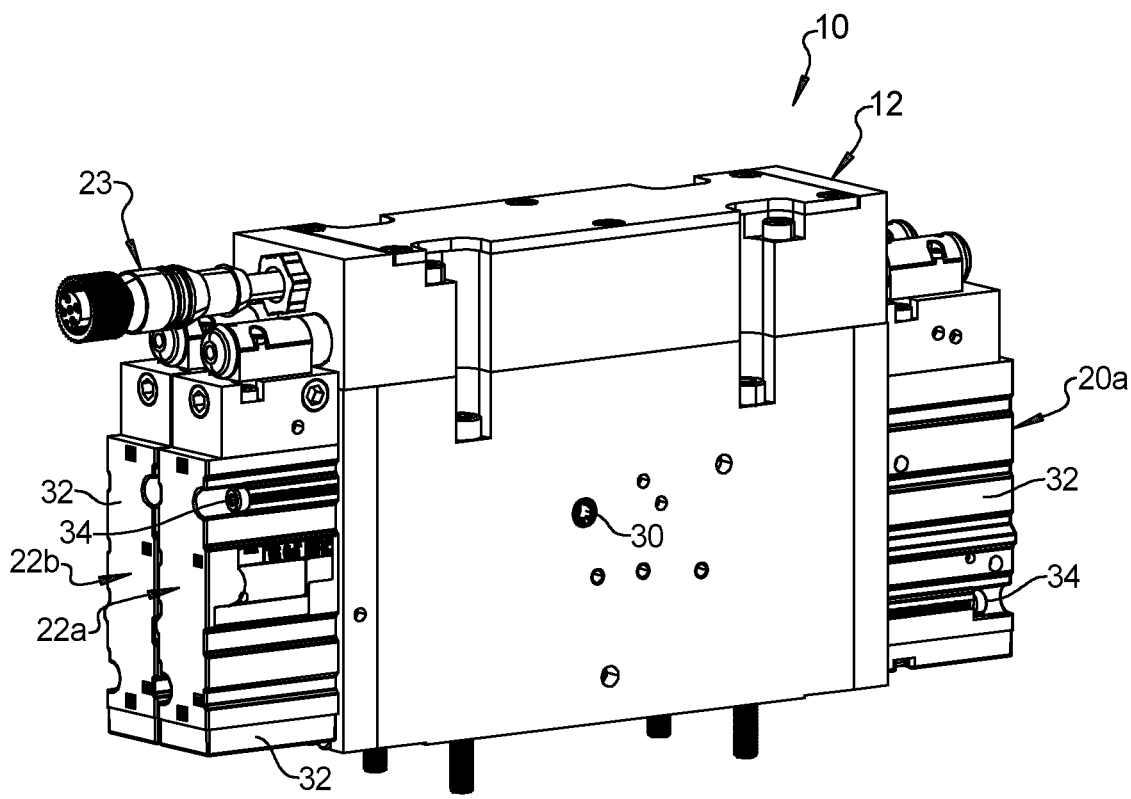
FIG. 15 is a perspective view of a valve assembly having the schematic configuration illustrated in FIGS. 7-14.

FIG. 12 illustrates a situation where the pressure at outlet 16 needs to be quickly reduced. In such a situation, controller 24 may instruct valve driver circuit 28 to de-energize each dump valve 22b and 22c to quickly allow fluid to exit valve assembly 10 through each dump valve 22b and 22c and exhausts 18 and 30 (FIG. 14). While only dump valves 22b and 22c are illustrated in FIG. 14 as being de-energized to quickly reduce the pressure at outlet 16, it should be understood that all of the dump valves 22a-22c may be de-energized to lower the pressure at outlet 16 without departing from the scope of the present disclosure.

Figure 13:
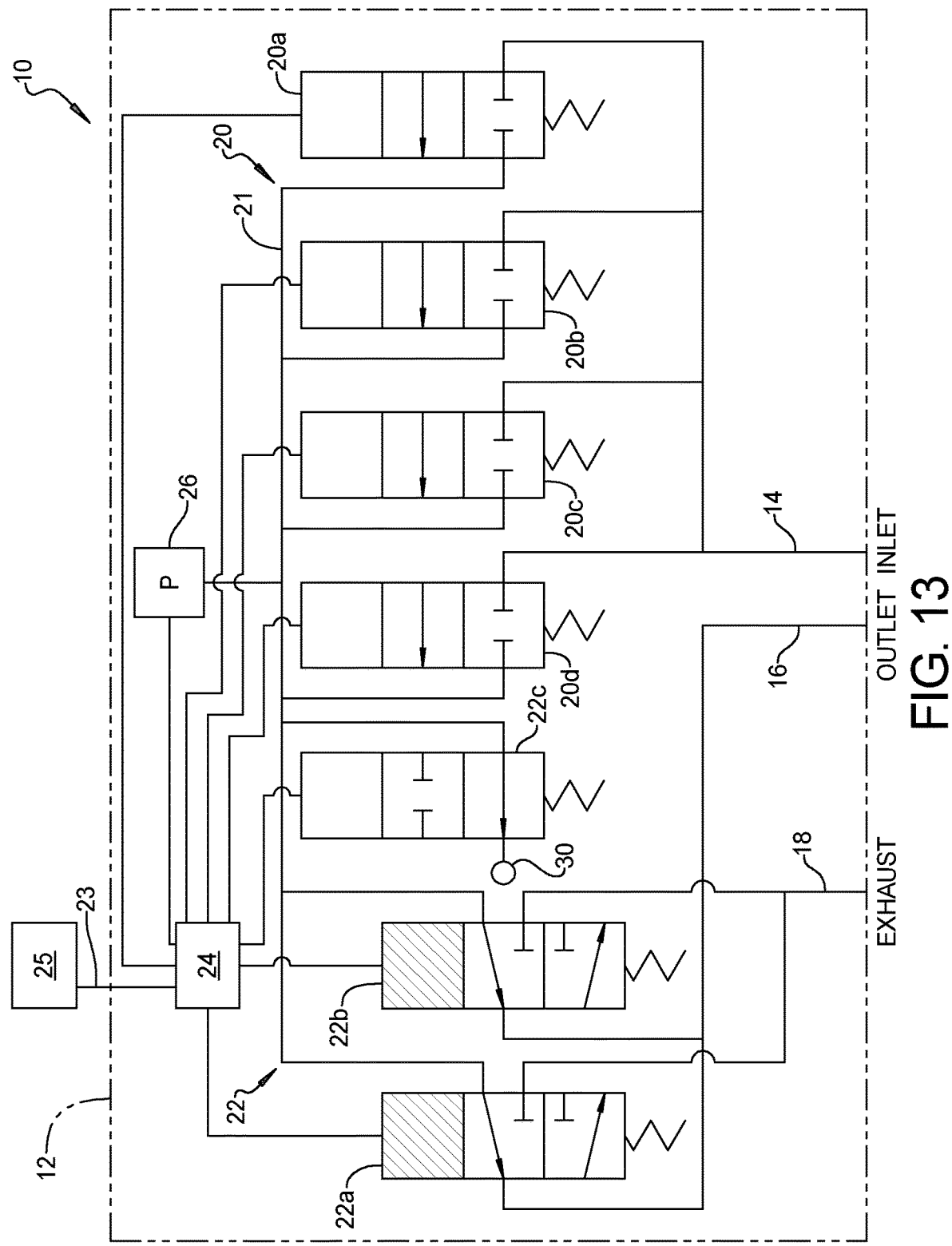
FIG. 13 is a schematic representation of the valve assembly when the valve assembly is being used to slowly depressurize a fluid.

While the configuration of FIG. 14 can be used to quickly reduce the pressure at outlet 16, it should also be understood that the configuration of FIG. 14 can be used when the pressure at outlet 16 is relatively high (e.g., thirty psi), and the system that incorporates valve assembly 10 only requires an output of fluid at a pressure that is substantially reduced (e.g., fifteen psi). In such an instance, dump valves 22b and 22c or only low-flow dump valve 22b can be de-energized to steadily reduce the pressure at outlet 16. As pressure sensor 26 monitors the reduction in pressure, low-flow dump valve 22b can be energized to slow the reduction in pressure toward the target pressure (e.g., fifteen psi), which allows only lower-flow dump valve 22c to permit the fluid to exit valve assembly 10 through secondary exhaust 30 (FIG. 13). If the pressure at outlet 16 detected by pressure sensor 26 undershoots (i.e., is less than) the target pressure (e.g., fifteen psi), lower-flow dump valve 22b may be energized and lowest-flow fill valve 20d may be re-energized (FIG. 11) to allow the pressure to reach the target pressure.

According to the above-described embodiment, the pressure and fluid output from valve assembly 10 can be dynamically controlled. In other words, by continuously using pressure sensor 26 to detect the pressure at outlet 16, each fill valve 20 and dump valve 22 can be controlled to increase the pressure output from outlet 16, decrease the pressure output from outlet 16, or maintain the pressure output from outlet 16. Moreover, due to the use of fill valves 20b-20d and dump valve 22b and 22c, the pressure output from outlet 16 can be more strictly controlled to substantially minimize instances where the desired or target pressures has either been overshot or undershot. In addition, if only small pressure changes are required, fill valves 20b-20d and dump valves 22b and 22c can be used to achieve the small changes in pressure desired. Further, it should be understood that by using multiple fill valves 20 and dump valves 22, if one of the fill valves 20 and/or dump valves 22 fails, the valve assembly 10 is still operable, albeit with reduced capability.

In each of the above-described embodiments, it should be understood that controller 24 may be embedded with custom software configured to manipulate the multiple fill valves 20 and multiple dump valves 22 such that the performance characteristics of the valve assembly 10 can be customized for each particular application where valve assembly 10 is to be used. The software, with built in read/write features, can also have the ability to learn and make changes based on specific application characteristics, which allows for optimized performance of valve assembly in a specific application.

More specifically, due to the software having a read/write feature, the software is able to teach itself about various parameters required or necessary for a specific application such as the working volume of fluid that needs to be output, any leakage, speed at which fluid outputs are required, breakaway forces required to actuate an actuator, and frictional characteristics of the actuators in order to optimize the time that is required to reach the desired pressure and minimize overshoot and undershoot. The software may also be able to monitor the changes of the working volume, so that the dynamics of the valve assembly 10 may continue to be optimized for each commanded target pressure.

Figure 16:
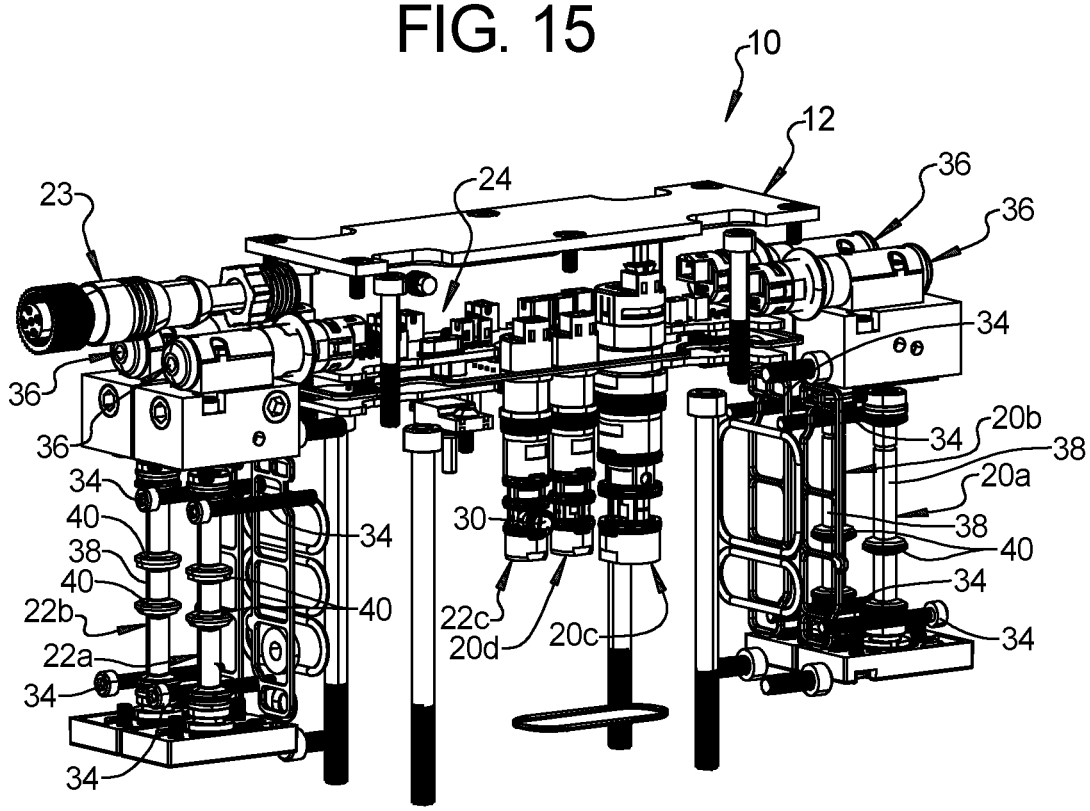
FIG. 16 is a perspective view of the valve assembly illustrated in FIG. 14, with various portions of a valve housing and valve casings removed.
Figure 17:
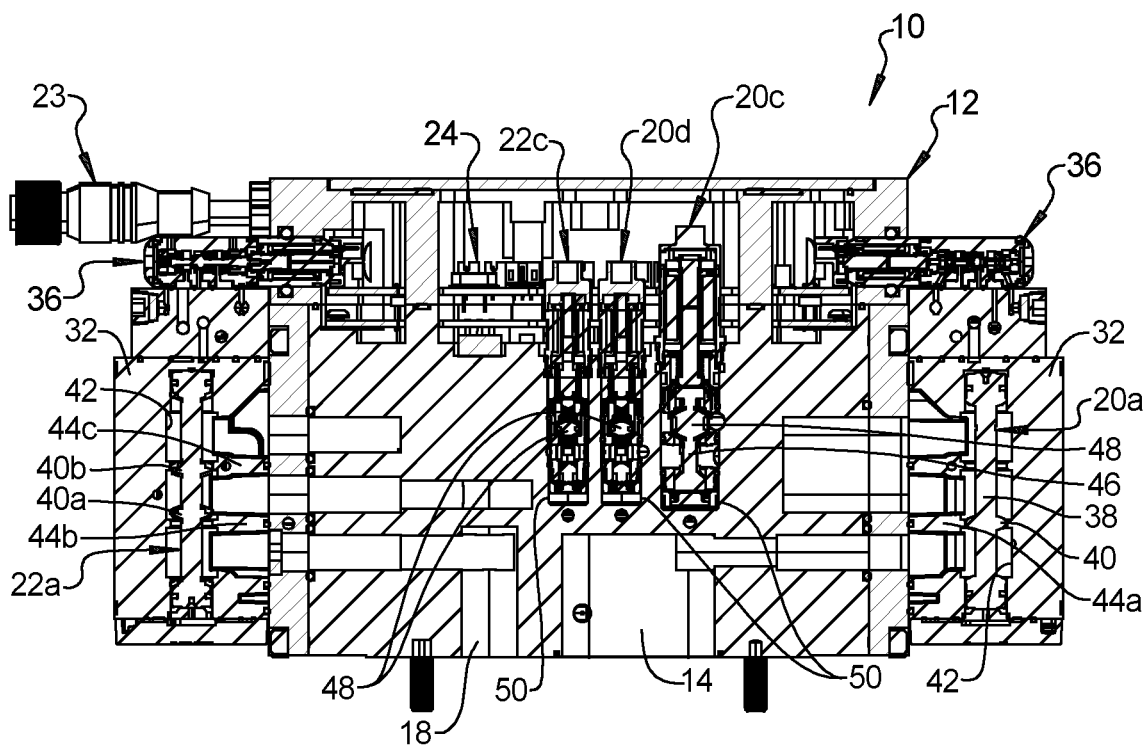
FIG. 17 is a cross-sectional view of the valve assembly illustrated in FIG. 15.
Figure 18:
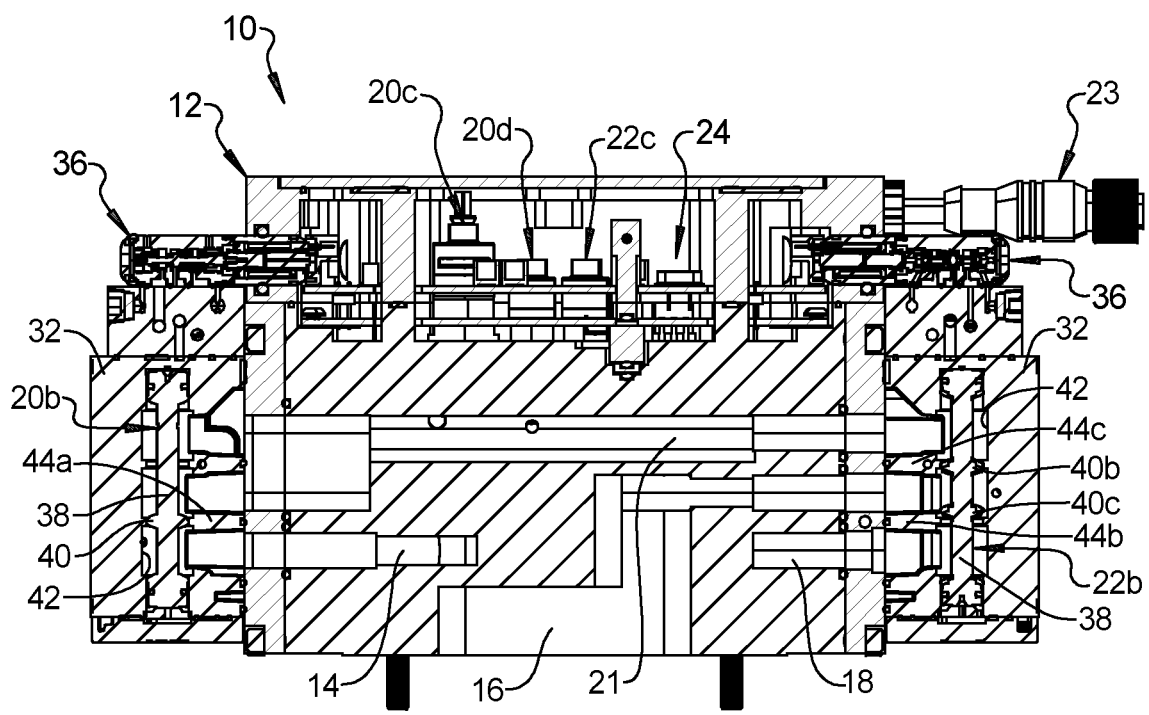
FIG. 18 is a cross-sectional view of the valve assembly illustrated in FIG. 15.

Now referring to FIGS. 15-18, an example valve assembly 10 incorporating the valve circuit illustrated in FIGS. 7 to 14 is illustrated. Valve assembly 10 includes housing 12, inlet 14, outlet 16, exhaust 18, secondary pressure path 21, and secondary exhaust 30. As best shown in FIG. 16, valve assembly 10 also includes fill valves 20a to 20d, dump valves 22a to 22c, and controller 24. In FIG. 16, the casings 32 that attach fill valves 20a and 20b and dump valves 22a and 22b to housing 12 via bolts 34 have been removed to reveal the structure of fill valves 20a, 20b and dump valves 22a, 22b. Fill valves 20a, 20b and dump valves 22a, 22b are solenoid pilot-operated valves that are actuated by pilots 36.

Fill valves 20a and 20b each include a piston 38 that defines a pair of valve member 40. Casings 32 for fill valves 20a and 20b define a valve bore 42 (FIGS. 17 and 18) that includes valve seat 44a for valve member 40. As piston 38 is actuated by pilot 36, valve member 40 will move away from valve seat 44a to allow for flow through fill valve 20a, 20b to pressurize valve assembly 10.

Dump valves 22a and 22b also each include a piston 38 that defines a pair of valve members 40a and 40b. Casings 32 for dump valves 22a and 22b define a valve bore 42 that includes a pair of valve seats 44b and 44c for valve members 40a and 40b, respectively. Dump valves 22a and 22b include a pair of valve members 40a, 40b and a pair of valve seats 44b, 44c because, as noted above, dump valves 22a and 22b communicate with exhaust 18 when not energized, and create a connection of secondary pressure path 21 to outlet 16 when energized. As piston 38 is actuated by pilot 36 (i.e., energized), valve member 40b will move away from valve seat 44c and valve member 40c will move into engagement with valve seat 44b to prevent flow to exhaust 18 and permit flow through dump valves 22a, 22b to pressurize outlet 16.

Fill valves 20c, 20d and dump valve 22c are solenoid actuated valves. Each fill valve 20c, 20d and dump valve 22c each include a valve stem 46 defining a valve member 48 that is located within a valve bore 50 formed in housing 12. Valve bores 50 communicate with passages (not shown) that, in the case of fill valves 20c, 20d communicate with inlet 14 and outlet 16. Valve bore 50 of dump valve 22c communicates with secondary pressure path 21 and secondary exhaust 30. When each of fill valves 20c, 20d are energized, valve members 48 will unblock inlet 14 and allow communication with secondary pressure path 21 outlet 16. When dump valve 22c is energized, it is blocked.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve assembly, comprising:
    a housing having a fluid inlet, a fluid outlet, and an exhaust;
    a plurality of fill valves that each communicate with the fluid inlet and the fluid outlet;
    a plurality of dump valves that each communicate with the fill valves, the exhaust, and the fluid outlet;
    a pressure sensor configured to generate a signal indicative of a fluid pressure within the housing; and
    a controller that is configured, based on a command signal received by the controller that includes a desired pressure to be output from the fluid outlet in comparison to the signal indicative of the fluid pressure, to selectively open and close each of the fill valves and each of the dump valves,
    wherein to pressurize and output a fluid from the valve assembly at the desired pressure, the controller is configured to selectively open and close the plurality of fill valves and the plurality of dump valves until the desired pressure is reached, and
    wherein when the plurality of dump valves are closed, fluid is permitted to flow from the fluid outlet through each of the plurality of dump values to the exhaust.

2. The valve assembly according to claim 1, wherein to reduce a pressure of the fluid output from the fluid outlet, the controller is configured to selectively open and close a number of the plurality of dump valves to permit the fluid to exit the valve assembly through the exhaust.

3. The valve assembly according to claim 1, wherein during pressurizing of the fluid, the plurality of fill valves are opened and the plurality of dump valves are closed.

4. The valve assembly according to claim 3, wherein as the fluid approaches the desired pressure, the controller is configured to close some of the fill valves and maintain some of the fill valves in an open position until the desired pressure is reached.

5. The valve assembly according to claim 4, wherein as the fluid is pressurized to the desired pressure, if the pressure sensor generates a signal that indicates that the fluid pressure is greater than the desired pressure, the controller is configured to close the fill valves and open at least one of the dump valves to reduce the fluid pressure until the desired pressure is reached.

6. The valve assembly according to claim 1, wherein the controller includes a valve driver circuit in communication with each of the fill valves and each of the dump valves, the valve driver circuit being configured to apply a voltage to each of the fill valves and each of the dump valves to open and close each of the fill valves and each of the dump valves.

7. The valve assembly according to claim 6, wherein each of the fill valves and each of the dump valves are either a solenoid-operated valve or a pilot-operated solenoid valve.

8. The valve assembly according to claim 1, wherein the plurality of fill valves includes at least a first fill valve and a second fill valve, the first fill valve permitting a greater amount of fluid to flow therethrough in comparison to the second fill valve.

9. The valve assembly according to claim 8, wherein as the fluid approaches the desired pressure, the controller is configured to first close the first fill valve before closing the second fill valve.

10. The valve assembly according to claim 1, wherein the plurality of dump valves includes at least a first dump valve and a second dump valve, the first dump valve permitting a greater amount of fluid to flow therethrough in comparison to the second dump valve.

11. The valve assembly according to claim 10, wherein as the fluid is pressurized to the desired pressure, if the pressure sensor generates a signal that indicates that the fluid pressure is greater than the desired pressure, the controller is configured to close the fill valves and open at least one of the first and second dump valves to reduce the fluid pressure until the desired pressure is reached.

12. The valve assembly according to claim 10, further comprising a third dump valve that communicates with a secondary exhaust.

13. The valve assembly according to claim 10, wherein when the first dump valve and the second dump valve are open, fluid is permitted to flow through the first dump valve and the second dump valve to the fluid outlet.

14. The valve assembly according to claim 1, wherein when the pressure in the valve assembly is to be reduced from the desired pressure to a target pressure, the controller is configured to open the plurality of dump valves.

15. The valve assembly according to claim 14, wherein as the fluid approaches the target pressure, the controller is configured to close the first dump valve and maintain the second dump valve in an open position until the target pressure is reached.

16. The valve assembly according to claim 15, wherein as the fluid pressure is reduced to the target pressure, if the pressure sensor generates a signal that indicates that the fluid pressure is less than the target pressure, the controller is configured to close the second dump valve and open at least the second fill valve to raise the pressure to the target pressure.

17. A valve assembly, comprising:
a housing having a fluid inlet, a fluid outlet, an exhaust, and an interior flow path connected to the fluid outlet;
a plurality of fill valves that permit a fluid to flow from the fluid inlet into the interior flow path to increase a pressure of the fluid output from the fluid outlet;
a plurality of dump valves that permit the fluid to flow from the interior flow path to the exhaust to reduce the pressure of the fluid output from the fluid outlet, and when the plurality of dump valves are closed the plurality of dump valves permit the fluid to flow from the fluid outlet to the exhaust;
a pressure sensor in communication with the interior flow path that is configured to generate a signal indicative of an actual pressure of the fluid output from the fluid outlet; and
a controller that is configured for receipt of a command signal including a desired pressure of the fluid to be output from the fluid outlet, and configured for receipt of the signal indicative of the actual pressure of the fluid output from the fluid outlet,
wherein based on a comparison of the command signal with the signal indicative of the actual pressure, the controller is configured to selectively open and close each of the fill valves and each of the dump valves until the actual pressure is equal to the desired pressure.

18. The valve assembly according to claim 17, wherein if the actual pressure is less than the desired pressure, the controller is configured to selectively open a number of the fill valves to increase the actual pressure.

19. The valve assembly according to claim 17, wherein if the actual pressure is greater than the desired pressure, the controller is configured to selectively open a number of the dump valves to decrease the actual pressure.

20. The valve assembly according to claim 17, wherein at least some of the dump valves are configured to prevent the interior flow path from receiving a return flow of the fluid from the outlet.

* * * * *